3,478,079
NOVEL DIALKOXYMETHYL(TRIALKOXY) SILANES AND A METHOD FOR THEIR PREPARATION
William H. Atwell, Midland, Mich., assignor to Dow Corning Corporation, Midland, Mich., a corporation of Michigan
No Drawing. Filed Nov. 14, 1967, Ser. No. 682,995
Int. Cl. C07f 7/18; C07c 43/04
U.S. Cl. 260—448.8                                8 Claims

ABSTRACT OF THE DISCLOSURE

Novel dialkoxymethyl(trialkoxy)silanes which are useful as methylene transfer reagents for the production of other useful compounds. Illustrative of a dialkoxymethyl (trialkoxy)silane of this invention is a compound of the formula $(CH_3O)_3SiCH(OCH_3)_2$. Illustrative of its preparation is the following:

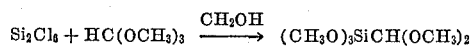

$$Si_2Cl_6 + HC(OCH_3)_3 \xrightarrow{CH_3OH} (CH_3O)_3SiCH(OCH_3)_2$$

---

This invention relates to novel dialkoxymethyl(trialkoxy)silanes which are useful as methylene transfer reagents for the production of a wide variety of useful compounds, e.g., 7-methoxy-norcarane, dimethoxymethane, cis/trans-1-methoxy-2-(trimethoxysilyl)cyclopropane, (trimethoxysilyl)methoxymethane, and 1-methoxy-2,3 - bis (trimethylsilyl)cyclopropene.

The alkoxylation of chlorosilanes with orthoformates, or orthoformate-alcohol, mixtures, has been reported previously (British Patent 993,881) wherein the resulting compound is an alkoxylated silane. However, it has been unexpectedly found that when one reacts a hexahalodisilane with orthoformates or a mixture of orthoformates and the corresponding alcohol, in contrast to the expected alkoxylated disilane formation, Si—Si bond cleavage occurs to provide the heretofore unknown dialkoxymethyl (trialkoxy)silanes of the present invention.

This invention relates to novel dialkoxymethyl(trialkoxy)silanes of the formula $$R_3SiCHR_2$$

in which R is an alkoxy radical of from 1 to 6 carbon atoms inclusive.

This invention further relates to a process for preparing novel dialkoxymethyl(trialkoxy)silanes comprising (A) mixing at a temperature of from 0° C. to 100° C.,
  (1) a disilane of the formula $Si_2(X)_6$, in which X is a member selected from the group consisting of a chlorine atom, a bromine atom, and an iodine atom, with
  (2) at least 7 moles per mole of (1) of an alkylorthoformate of the formula $HCR_3$, in which R is an alkoxy radical of from 1 to 6 carbon atoms inclusive, (B) thereafter recovering the novel dialkoxymethyl(trialkoxy)silane by distillation.

As noted above, R can be any alkoxy radical of from 1 to 6 carbon atoms inclusive such as the methoxy, ethoxy, propoxy, isopropoxy, butoxy, isobutoxy, amyloxy, and hexoxy radical. As the carbon chain increases in length, decomposition of the desired dialkoxymethyl(trialkoxy) silane also tends to increase resulting in substantially decreased yields of the final product; hence, for purposes of the present invention, it is preferred that R be a methoxy radical.

The disilane (1) is a hexahalodisilane in which the halogen atom (X) can be chlorine, bromine, or iodine. In view of commercial availability, it is preferred that X be a chlorine atom.

Decomposition of the desired product also tends to occur at higher temperatures, thus the process must be conducted at temperatures below 100° C. to insure practicable yields of the novel dialkoxymethyl(trialkoxy) silane. Since improved yields are obtained at lower temperatures, it is preferred that the reaction be conducted at a temperature in the range from 0° C. to 25° C.

It is to be noted that the appropriate alcohols can be employed in the process of the present invention, and although they are not necessary, the alcohols in effect act as a catalyst and substantially promote or enhance the process. For example, if methylorthoformate is used as the alkylorthoformate, the addition of the corresponding alcohol (methyl alcohol) has been found to be especially advantageous. Although the amount of alcohol used is not particularly critical, approximately 10 to 25 weight percent of the alcohol base on the weight of the alkylorthoformate has been found to be satisfactory.

As previously noted, the novel dialkoxymethyl(trialkoxy)silanes of this invention are useful as reactants in the production of other materials. It is proposed that the dialkoxymethyl(trialkoxy)silanes undergo a low temperature thermally induced methylene transfer reaction and can be reacted with olefins, alcohols, vinylsilanes, silicon hydrides, silacetylenes, and the like, to provide a variety of materials which are suitable for a number of important applications, i.e., as latent catalysts, coupling agents, etc.

The following examples are merely illustrative and are not to be construed as limiting the invention which is properly delineated in the appended claims.

EXAMPLE 1

A mixture of 1,569 grams (14.8 mols) of methylorthoformate and 150 grams (4.7 mols) of methanol was added to 590 grams (2.19 mols) of hexachlorodisilane. The reaction mixture was maintained below 60° C. throughout the addition. Subsequent to addition, the byproduced methylchloride and methylformate were removed by distillation and the reaction mixture was heated at 65° C. to 75° C. until neutral. Strip-distillation to remove byproduced tetramethoxysilane followed by fractional distillation afforded 215 grams (50 percent) of a product having the formula $(CH_3O)_3SiCH(OCH_3)_2$. The product had a boiling point of 73°–74°/9 mm. The structure was confirmed by elemental, infrared, N.M.R., and mass spectral analyses.

EXAMPLE 2

When hexabromodisilane and hexaidodisilane were substituted for the corresponding silane of Example 1, equivalent results were obtained.

EXAMPLE 3

When the following orthoformates and alcohols were substituted for the corresponding compounds of Example 1 in equivalent molar ratios, the alkoxymethylsilanes noted below were obtained.

| | Orthoformate | Alcohol | Silane |
|---|---|---|---|
| (A) | $HC(OCH_2CH_3)_3$ | $CH_3CH_2OH$ | $(CH_3CH_2O)_3SiCH(OCH_2CH_3)_2$ |
| (B) | $HC(OCH_2CH_2CH_2CH_3)_3$ | $CH_3CH_2CH_2CH_2OH$ | $(CH_3CH_2CH_2CH_2O)_3SiCH(OCH_2CH_2CH_3)_2$ |
| (C) | $HC(OCH_2CH_2CH_2CH_2CH_2CH_3)_3$ | $CH_3CH_2CH_2CH_2CH_2CH_2OH$ | $(CH_3CH_2CH_2CH_2CH_2CH_2O)_3SiCH(OCH_2CH_2CH_2CH_2CH_2CH_3)_2$ |

EXAMPLE 4

Examples 4 through 8 demonstrate the reactivity of $(CH_3O)_3SiCH(OCH_3)_2$ with olefins, alcohols, vinylsilanes, silicon hydrides, and silacetylenes.

A mixture of 10 grams (0.05 mol) of $(CH_3O)_3SiCH(OCH_3)_2$ and 12.5 grams (0.15 mol) of cyclohexene was heated at 125° C. in a sealed ampoule for 16 hours. Distillation afforded 3.0 grams (48 percent) of a compound of the formula

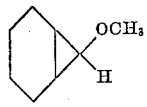

The properties of the above product (7-methoxy-norcarane) were in agreement with literature values.

EXAMPLE 5

A mixture of 2.0 grams (0.01 mol) of $(CH_3O)_3SiCH(OCH_3)_2$ and 0.65 gram (0.02 mol) of anhydrous methanol was heated in an ampoule at 125° C. for 16 hours. A 75 percent yield of $CH_3OCH_2OCH_3$ (dimethoxymethane) was obtained.

EXAMPLE 6

A sealed ampoule containing a mixture of 8.2 grams (0.042 mol) of $(CH_3O)_3SiCH(OCH_3)_2$ and 6.2 grams (0.042 mol) of vinyltrimethoxysilane was heated at 125° C. for 16 hours. Distillation afforded 3.3 grams (50 percent of a product of the formula

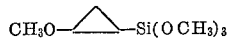

The structure (cis/trans-1-methoxy-2[trimethoxysilyl]cyclopropane) had a boiling point of 105°–106° C./58 mm. and was confirmed by elemental, infrared, N.M.R., and mass spectral analyses.

EXAMPLE 7

A mixture of 8.0 grams (0.048 mol) of $(CH_3O)_3SiCH(OCH_3)_2$ and 11.75 grams (0.96 mol) of trimethoxysilane was heated in an ampoule at 125° C. for 16 hours. Distillation afforded 4.4 grams (54 percent) of a product of the formula $(CH_3O)_3SiCH_2OCH_3$. The structure (trimethoxysilyl)methoxymethane was confirmed by elemental, infrared, N.M.R., and mass spectral analyses.

EXAMPLE 8

A mixture of 7.32 grams (0.037 mol) of $(CH_3O)_3SiCH(OCH_3)_2$ and 9.53 grams (0.056 mol) of bis (trimethylsilyl)acetylene was heated in an ampoule at 125° C. for 16 hours. Distillation afforded 3.5 grams (47 percent) of a compound of the formula

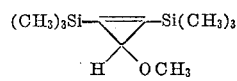

The above product (1-methoxy-2,3-bis[trimethylsilyl]cyclopropene) had a boiling point of 95° C./50 mm. The structure was confirmed by elemental, infrared, N.M.R., and mass spectral analyses.

That which is claimed is:

1. Novel dialkoxymethyl(trialkoxy)silanes of the formula $R_3SiCHR_2$ in which R is an alkoxy radical of from 1 to 6 carbon atoms inclusive.

2. A silane as recited in claim 1 wherein R is a methoxy radical.

3. A silane as recited in claim 1 wherein R is an ethoxy radical.

4. A process for preparing novel dialkoxymethyl(trialkoxy)silanes comprising (A) mixing at a temperature of from 0° C. to 100° C.,
  (1) a disilane of the formula $Si_2(X)_6$, in which X is a member selected from the group consisting of a chlorine atom, a bromine atom, and an iodine atom, with
  (2) at least 7 mols per mole of (1) of an alkylorthoformate of the formula $HCR_3$, in which R is an alkoxy radical of from 1 to 6 carbon atoms inclusive, (B) thereafter recovering the novel dialkoxymethyl(trialkoxy)silane by distillation.

5. The process as recited in claim 4 wherein X is a chlorine atom.

6. The process as recited in claim 5 wherein the alkylorthoformate (2) is methylorthoformate.

7. The process as recited in claim 6 wherein there is included from 10 to 25 weight percent methanol based on the weight of the methylorthoformate.

8. The process as recited in claim 7 wherein the process is conducted at a temperature of from 0° C. to 25° C.

References Cited

UNITED STATES PATENTS 2,698,861   1/1955   Shorr _____ 260—448.8

FOREIGN PATENTS 993,881   6/1965   Great Britain.

TOBIAS E. LEVOW, Primary Examiner

P. F. SHAVER, Assistant Examiner

U.S. Cl. X.R.

260—611, 615